United States Patent
Beisel et al.

(10) Patent No.: US 9,933,075 B2
(45) Date of Patent: Apr. 3, 2018

(54) SEALING SYSTEM FOR A WELL VALVE

(71) Applicant: Halliburton Energy Services, Inc., Houston, TX (US)

(72) Inventors: Joseph A. Beisel, Duncan, OK (US); Lawrence A. Herndon, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/038,692

(22) PCT Filed: Dec. 16, 2013

(86) PCT No.: PCT/US2013/075332
§ 371 (c)(1),
(2) Date: May 23, 2016

(87) PCT Pub. No.: WO2015/094156
PCT Pub. Date: Jun. 25, 2015

(65) Prior Publication Data
US 2016/0281862 A1    Sep. 29, 2016

(51) Int. Cl.
*F16K 5/04* (2006.01)
*E21B 33/068* (2006.01)
(Continued)

(52) U.S. Cl.
CPC .......... *F16K 5/0471* (2013.01); *E21B 21/106* (2013.01); *E21B 33/068* (2013.01); *E21B 34/02* (2013.01)

(58) Field of Classification Search
CPC ....... F16K 5/0471; E21B 34/02; E21B 33/068
(Continued)

(56) References Cited

U.S. PATENT DOCUMENTS 2,986,367 A  *  5/1961  Le Rouax ............... E21B 33/06
                                                    251/1.3
4,506,696 A  *  3/1985  von Pechmann ....... F16K 5/182
                                                    137/246.11
(Continued)

FOREIGN PATENT DOCUMENTS

EP         1023982 A1      8/2000

OTHER PUBLICATIONS

PCT International Search Report and Written Opinion of the International Searching Authority, PCT/US2013/075332, dated Sep. 17, 2014, 10 pages.

*Primary Examiner* — Marina Tietjen
(74) *Attorney, Agent, or Firm* — John Wustenberg; Parker Justiss, P.C.

(57) ABSTRACT

A sealing system for a well valve includes a valve closure, a valve closure carrier, and seal elements. The valve closure includes a central bore. The valve closure carrier includes an annular, metal sealing surface in contact with the exterior of the valve closure to form a metal-to-metal seal with the valve closure. The valve closure carrier defines two flow holes, each of which communicates with the central bore when the valve closure is open to flow fluid, and is sealed from the central bore by the sealing surface when the valve closure is closed. The first seal element seals between the valve closure carrier and the valve closure, and surrounds the first flow hole. The second seal element seals between the valve closure carrier and the valve closure, and surrounds the first seal element and an end opening of the central bore when the valve closure is closed.

13 Claims, 6 Drawing Sheets

(51) Int. Cl.
    *E21B 21/10*     (2006.01)
    *E21B 34/02*     (2006.01)
(58) Field of Classification Search
    USPC .................................................. 251/309, 314
    See application file for complete search history.

(56)                References Cited

U.S. PATENT DOCUMENTS 4,796,858 A  *  1/1989  Kabel .................... F16K 5/182
                                                    137/860
    5,234,193 A     8/1993  Neal, Jr. et al.
    5,234,194 A     8/1993  Smith
 2005/0006150 A1    1/2005  Sims et al.
 2011/0175008 A1    7/2011  McGuire et al.

* cited by examiner

SEALING SYSTEM FOR A WELL VALVE

CROSS-REFERENCE TO RELATED APPLICATIONS

This application is a U.S. National Phase Application under 35 U.S.C. § 371 and claims the benefit of priority to International Application Serial Number PCT/US2013/075332, filed on Dec. 16, 2013, the contents of which are hereby incorporated by reference.

TECHNICAL FIELD

This disclosure relates valves for use in well operations.

BACKGROUND

A plug valve is a type of valve that uses a cylindrical plug as a closure mechanism. The plug has a central bore that is aligned with the direction of flow when the valve is opened and misaligned with the direction of flow when the valve is closed. A plug valve can have a profile that protrudes from the side of the pipe in which the plug valve is installed. Thus, plug valves are often used as surface valves, e.g., to control flow of well fluid (e.g., drilling mud, cement, fracking fluid, or other well fluid) into the well. The plug valve relies on high pressure, e.g., pressure of the well fluid, to create a hard metal-to-metal seal. At low pressures, however, the plug valve can be prone to leaks.

DESCRIPTION OF DRAWINGS

Like reference symbols in the various drawings indicate like elements.

DETAILED DESCRIPTION

This disclosure describes a sealing system for a well valve, e.g., plug valve. A plug valve includes a valve closure, e.g., a plug, and a valve closure carrier, e.g., an insert, that surrounds the valve closure in a housing or integral with the housing. The valve closure carrier seals to the valve closure forming a metal-to-metal seal that uses high pressure to enforce a contact between the valve closure carrier and the valve closure. At low pressure, however, the metal-to-metal seal may not be reliable and a gap can form on the high pressure side between the valve closure carrier and the valve closure resulting in leak of fluid or debris (or both) between the valve closure carrier and the valve closure. Moreover, a seal between the interior of the valve closure and the exterior of the valve closure carrier can be prone to contamination from the wiping action of the seal across a end fluid opening either in the valve closure or in the valve closure carrier.

This disclosure describes a sealing system for the plug valve that can decrease leakage at low pressure while keeping fluids and debris out of the well valve when the valve is in the closed position. As described below, the sealing system includes a pair of seals surrounding one or both flow holes in the valve closure carrier. When the valve closure, e.g., the plug, is rotated within the valve closure carrier, e.g., the inserts, to open or close the valve, one of the pair of seals does not pass over the flow hole. In this manner, the contamination can be kept out of the valve body decreasing corrosion from occurring inside the valve body. The sealing system can be implemented to improve the reliability and performance of the well valve, especially at low pressures. At high pressures, the well valve will resist flow regardless of the sealing system due to the metal-to-metal seal described above.

Figure 1A:
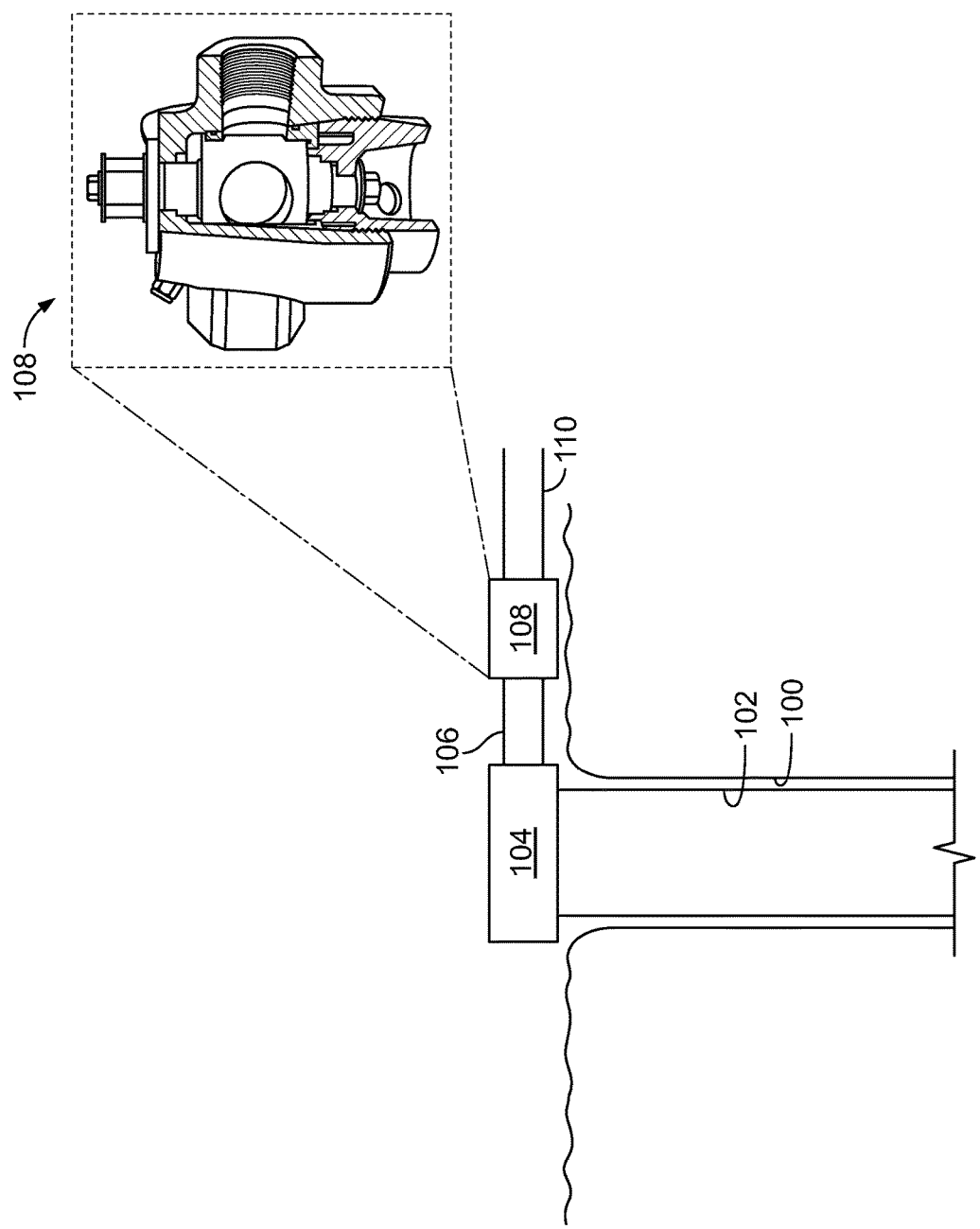
FIG. 1A is a schematic diagram of an example well system implementing a well valve.
Figure 1B:
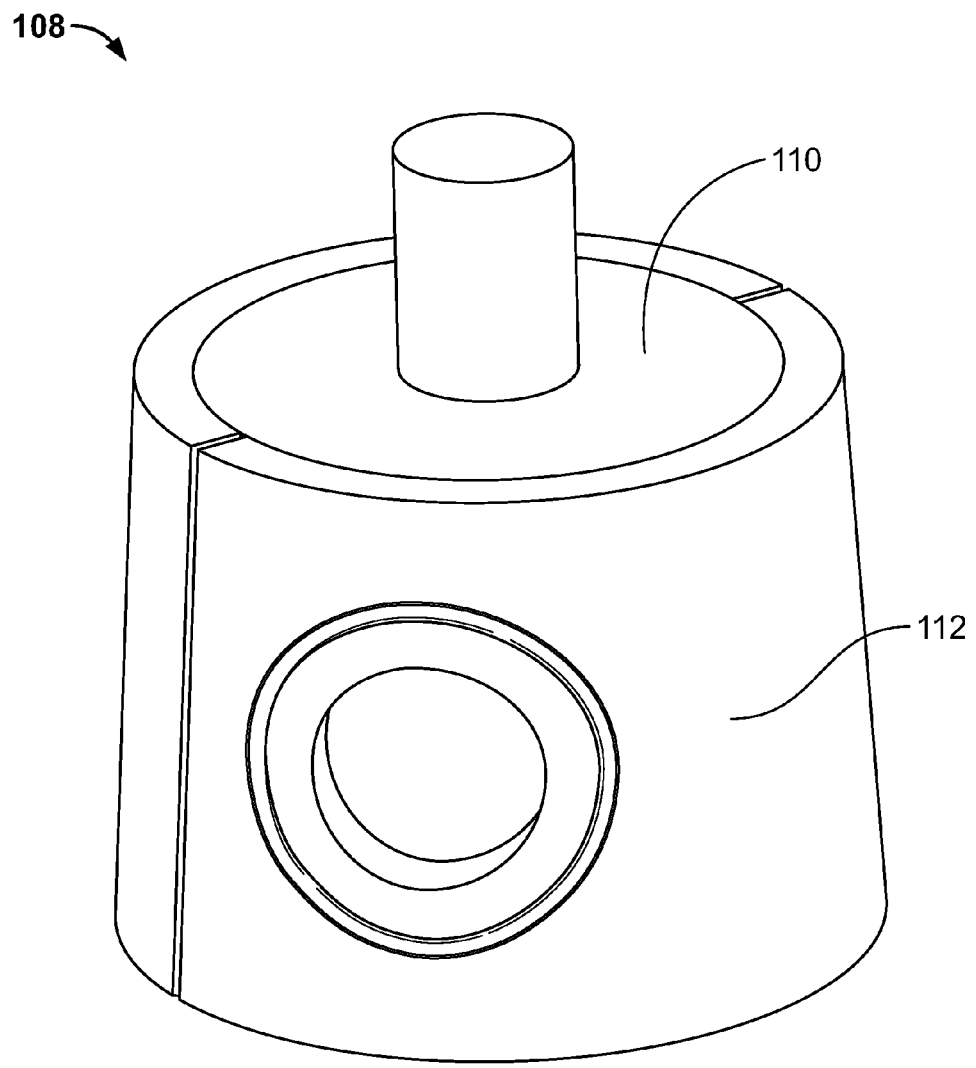
FIG. 1B is a perspective view of the well valve implemented in the well system of FIG. 1A.

FIG. 1A is a schematic diagram of an example well system implementing a well valve 108. The well valve 108 is a type of valve designed to withstand exposure to the environments of a well system, as well as exposure to well fluids and the temperatures, pressures, flows of well fluids. A casing 102 (e.g., one or more pieces of string connected end-to-end) is installed in a wellbore 100 and connected to a wellhead 104 positioned at the surface of a wellbore 100. Well fluid (e.g., formation fluid, drilling mud, cement, fracking fluid or other well fluid) can be flow into or out of the casing 102 by connecting one or more well pipes (e.g., well pipe 106, well pipe 110) to the wellhead 104. The well valve 108 can be positioned between two well pipes or between the wellhead 104 and a well pipe. The well valve 108 includes a valve closure 110 and a valve closure carrier 112 (shown in FIG. 1B) positioned within an outer housing, as described below. In some implementations, the valve closure carrier 112 and the outer housing can be separate elements, while, in other implementations, the valve closure carrier 112 can be integral with the housing, i.e., a portion of the housing constructed of material that forms a metal-to-metal seal with the valve closure 110.

Figure 2:
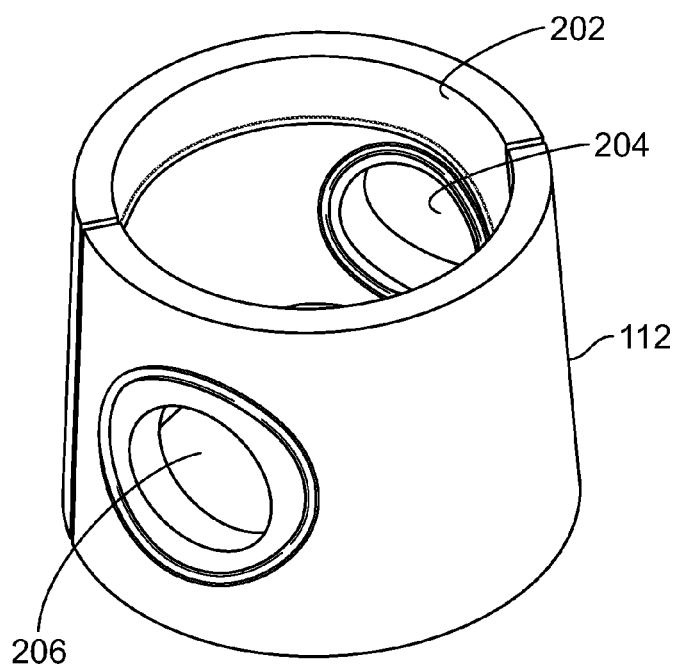
FIG. 2 is a perspective view of a valve closure carrier of the well valve of FIG. 1.
Figure 3:
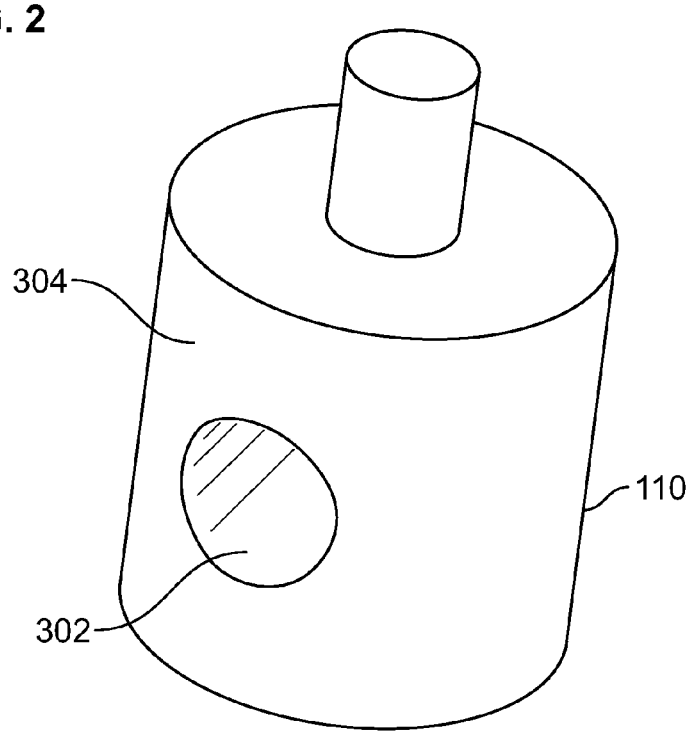
FIG. 3 is a perspective view of a valve closure of the well valve of FIG. 1.

FIG. 2 is a perspective view of a valve closure carrier 112 of the well valve 108. FIG. 3 is a perspective view of a valve closure 110 of the well valve 108. The valve closure 110 is cylindrical (generally or precisely) and includes an interior, central bore 302. The valve closure carrier 112 includes an annular, metal sealing surface 202 in contact with the exterior 304 of the valve closure 110 to form a metal-to-metal seal with the valve closure 110. The valve closure carrier 112 defines a first flow hole 204 and a second flow hole 206, each of which communicates with the central bore 302 when the valve closure 110 is open to flow fluid. Each of the first flow hole 204 and the second flow hole 206 is sealed from the central bore 302 by a metal-to-metal seal formed between the sealing surface 202 and the valve closure 110 when the valve closure 110 is closed.

Figure 4A:
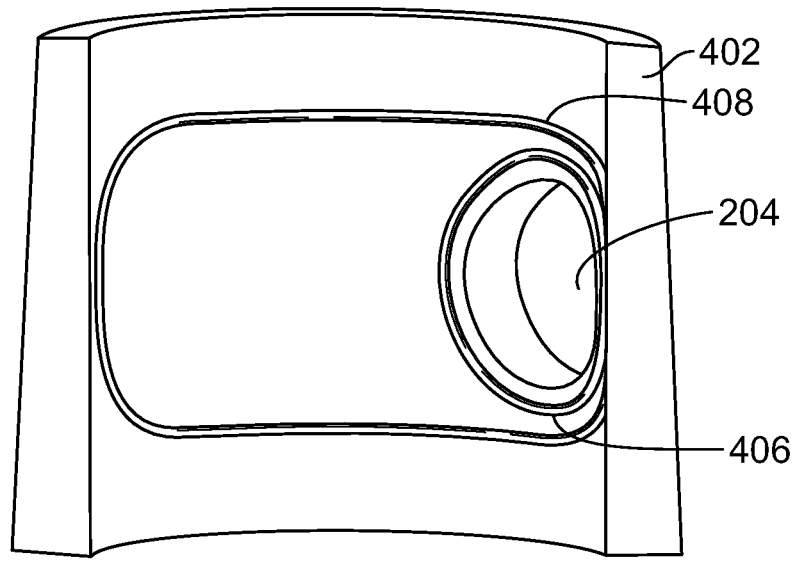
FIGS. 4A and 4B are perspective views showing seals on the interior of the valve closure carrier.
Figure 4B:
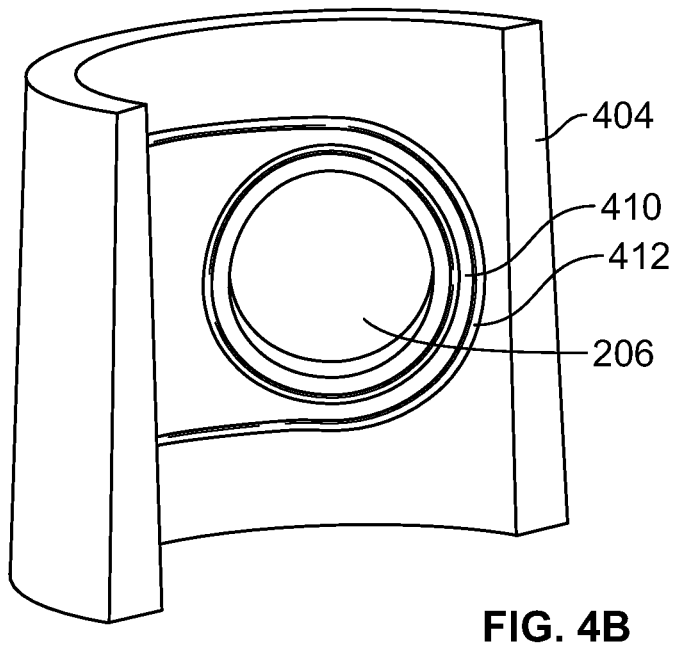

In some implementations, the valve closure carrier 112 can be implemented in two parts, e.g., two halves. FIGS. 4A and 4B are perspective views of each part, showing seals on the interior of the valve closure carrier 112. A first part 402 of the valve closure carrier 112 faces upstream and includes the first flow hole 204. A first seal element 406 is positioned between the valve closure carrier 112 and the valve closure 110. The first seal element 406 surrounds the first flow hole 204 to seal the valve closure carrier 112 to the valve closure 110 under low pressure. In certain instances, both the first flow hole 204 and the first seal element 406 are circular, but can be of other shapes. A second seal element 408 is positioned between the valve closure carrier 112 and the valve closure 110. The second seal element 408 surrounds the first seal element 406 and a first end fluid opening to the central bore 302 when the valve closure 110 is closed. The second seal element 408 seals against contamination from the fluid flow line from leaking into the gap between the valve closure carrier 112 and the valve closure 110. In certain instances, the second seal element 408 can be oval shaped. In some implementations, one or both of the first seal element 406 and the second seal element 408 include an elastomeric seal (e.g., an O-ring or other elastomeric seal) disposed in respective grooves formed on the interior surface of the first part 402 of the valve closure carrier 112. In addition to using the second seal element 408, the gap between the exterior surface of the valve closure 110 and the interior surface of the valve closure carrier 112 can be filled with grease (or other suitable filler material) to further prevent leakage of fluid or debris (or both) into the gap.

The central bore 302 includes a first end fluid opening and a second end fluid opening, that at least partially align with the first flow hole 204 and the second flow hole 206, respectively, when the well valve 108 is open. The second seal element 408 can encircle the first seal element 406 to not be exposed to the first end fluid opening when the valve closure 110 is opened or closed to fluid flow. To do so, a distance by which the second seal element 408 extends on the interior surface of the first part 402 can be greater than or equal to a stroke of the valve closure 110. For example, if the stroke of the valve closure 110 from an opened position of the well valve 108 to a closed position of the well valve 108 (or vice versa) is 90°, then the distance that the second seal element 408 extends on the interior surface of the valve closure carrier 112 can be at least one-quarter of the perimeter of the interior surface of the valve closure carrier 112. In implementations in which the first part 402 represents about one-half of the valve closure carrier 112, the second seal element 408 can encircle the first flow hole 204 and extend to at least one-half of the perimeter of the internal surface of the first part 402.

A second part 404 of the valve closure carrier 112 can face downstream and can include the second flow hole 206. A third seal element 410 is positioned between the valve closure carrier 112 and the valve closure 110. The third seal element 410 surrounds the second flow hole 206 to seal the valve closure carrier 112 to the valve closure 110 under low pressure. In certain instances, both the second flow hole 204 and the third seal element 410 are circular, but can be of other shapes. A fourth seal element 412 is positioned between the valve closure carrier 112 and the valve closure 110. The fourth seal element 412 surrounds the third seal element 410 and the second end fluid opening to the central bore 302 when the valve closure 110 is closed. Similar to the second seal element 408, the fourth seal element 412 seals against contamination from the fluid flow line from leaking into the gap between the valve closure carrier 112 and the valve closure 110. In certain instances, the fourth seal element 412 can be oval shaped. In some implementations, one or both of the third seal element 410 and the fourth seal element 412 include an elastomeric seal (e.g., an O-ring or other elastomeric seal) disposed in respective grooves formed on the interior surface of the second part 404 of the valve closure carrier 112. In addition to using the fourth seal element 412, the gap between the exterior surface of the valve closure 110 and the interior surface of the valve closure carrier 112 can be filled with grease (or other suitable filler material) to further prevent leakage of fluid or debris (or both) into the gap.

Figure 5A:
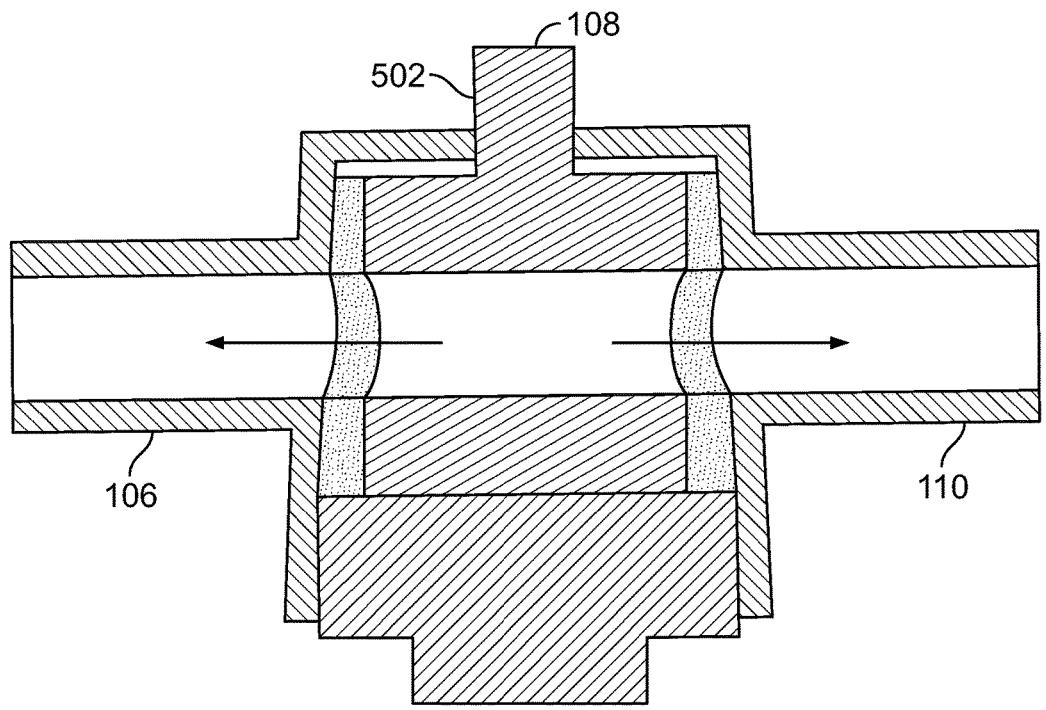
FIGS. 5A and 5B are schematic diagrams of flow through two well pipes between which the well valve is installed.
Figure 5B:
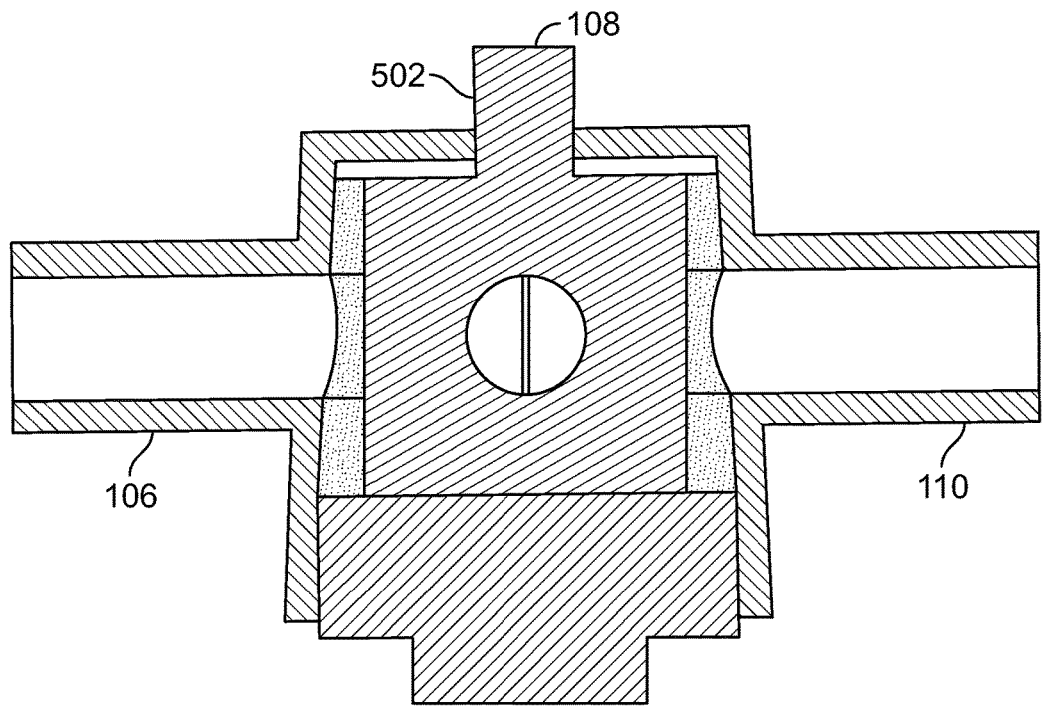
Figure 6:
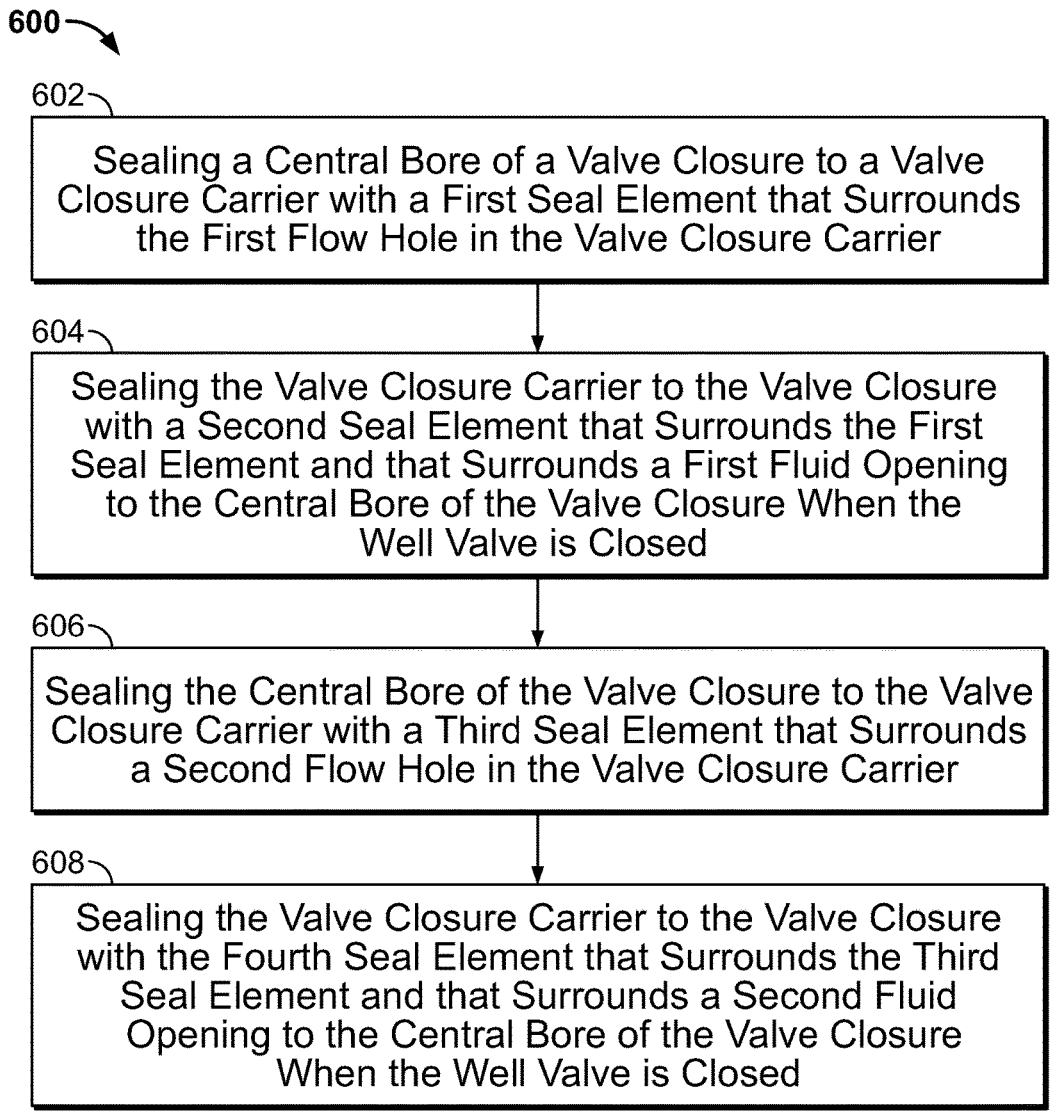
FIG. 6 is a flowchart of an example process for sealing using the well valve.

FIGS. 5A and 5B are schematic diagrams of flow through two well pipes (e.g., well pipe 106, well pipe 110) between which the well valve 108 is installed. FIG. 6 is a flowchart of an example process for sealing using the well valve 108. The housing of the well valve 108 can define an inlet and outlet to the well valve 108. An end of the well pipe 106 and an end of the well pipe 110 can be connected to the inlet and the outlet respectively. The well valve 108 can be opened or closed, i.e., the valve closure 110 can be turned one way or the other, using a stem 502 that protrudes outward of the housing. At 602, the well valve 108 can seal the central bore 302 of the valve closure 110 to the valve closure carrier 112 with the first seal element 406 that surrounds the first flow hole 204. At 604, the well valve 108 can seal the valve closure carrier 112 to the valve closure 110 with the second seal element 408 that surrounds the first seal element 406 and that avoids exposure to the first end fluid opening to the central bore 302 in the valve closure 110 when the well valve 108 is closed. The second seal element 408 avoids exposure to the first end fluid opening by not passing over the first end fluid opening when the valve closure 110 is rotated to open or close the well valve 108. At 606, the well valve 108 can seal the central bore 302 of the valve closure 110 to the valve closure carrier 112 with the third seal element 410 that surrounds the second flow hole 206. At 608, the well valve 108 can seal the valve closure carrier 112 to the valve closure 110 with the fourth seal element 412 that surrounds the third seal element 410 and that surrounds the second end fluid opening to the central bore 302 of the valve closure 110 when the well valve 108 is closed. Similar to the second seal element 408, the fourth seal element 412 avoids exposure to the second end fluid opening by not passing over the second end fluid opening when the valve closure 110 is rotated to open or close the well valve 108.

In operation, for example, well fluid can flow from the well pipe 106 to the well pipe 110 or vice versa. As shown in FIG. 5A, when the well valve 108 is open, the first flow hole 204 and the second flow hole 206 of the valve closure carrier 112 at least partially align with the first end fluid opening and the second end fluid opening to the central bore 302 of the valve closure, respectively, thereby permitting the well fluid to flow. The well valve 108 can be closed, e.g., by a quarter turn of the stem 502 which causes the valve closure 110 to turn by 90°. As the valve closure 110 turns, the second seal element 408 that surrounds the first flow hole 204 avoids exposure to the first end fluid opening to the central bore 302. Similarly, the fourth seal element 412 that surrounds the second flow hole 206 avoids exposure to the second end fluid opening to the central bore 302. In the closed position, the first flow hole 204 and the second flow hole 206 are misaligned from the first end fluid opening and the second end fluid opening. Under low pressure conditions, the first seal element 406 and the third seal element 410 seal the valve closure carrier 112 to the valve closure 110. As the pressure increases, the interior metal surface 202 of the valve closure carrier 112 augments the seal by providing a metal-to-metal seal with the exterior surface 304 of the valve closure 110.

In general, one innovative aspect of the subject matter described here can be implemented as a well valve that includes a valve closure, a valve closure carrier, a first seal element and a second seal element. The valve closure includes an interior, central bore. The valve closure carrier includes an annular, metal sealing surface in contact with the exterior of the valve closure to form a metal-to-metal seal with the valve closure. The valve closure carrier defines a first flow hole and a second flow hole. Each of the first flow hole and the second flow hole communicates with the central bore when the valve closure is open to flow, and is sealed from the central bore by the sealing surface when the valve closure is closed. The first seal element seals between the valve closure carrier and the valve closure, and surrounds the first flow hole. The second seal element seals between the valve closure carrier and the valve closure, and surrounds the first seal element and an end opening of the central bore when the valve closure is closed.

Another innovative aspect of the subject matter described here can be implemented as a well valve that includes a valve closure, a valve closure carrier, a first seal element and a second seal element. The valve closure includes an interior, central bore. The valve closure carrier includes an annular, metal sealing surface in contact with the exterior of the valve closure to form a metal-to-metal seal with the valve closure. The valve closure carrier defines a first flow hole and a second flow hole. Each of the first flow hole and the second flow hole communicates with the central bore when the valve closure is open to flow fluid, and is sealed from the central bore by the sealing surface when the valve closure is closed. The first seal element seals the first flow hole to the central bore when the valve closure is open, and surrounds the first flow hole. The second seal element seals between the valve closure carrier and the valve closure, and surrounds the first seal element and avoids exposure to a first fluid end opening to the central bore when the valve closure is opened or closed.

A further innovative aspect of the subject matter described here can be implemented as a method. In a well valve, a central bore of a valve closure is sealed to a valve closure carrier with a first seal element that surrounds a first flow hole in the valve closure carrier. In the well valve, the valve closure carrier is sealed to the valve closure with a second seal element that surrounds the first seal element and that surrounds a first fluid end opening to the central bore of the valve closure when the well valve is closed.

The aspects above can include some, none or all of the following features. The second seal element can encircle the first seal element to not be exposed to the first end fluid opening to the central bore in the valve closure when the valve closure is opened or closed to fluid flow. The first end fluid opening can at least partially align with the first flow hole when the valve closure is opened to flow fluid. The second seal element may not be exposed to any portion of the first end fluid opening when the valve closure is opened or closed. A third seal element can seal between the valve closure carrier and the valve closure, and surround the second flow hole. A fourth seal element can seal between the valve closure carrier and the valve closure, and surround the third seal element and a second fluid end opening of the central bore when the valve closure is closed. The fourth seal element can encircle the third seal element to not be exposed to the second end fluid opening to the central bore in the valve closure when the valve closure is opened or closed to fluid flow. The second end fluid opening can at least partially align with the second flow hole when the valve closure is open to fluid flow. The fourth seal element may not be exposed to any portion of the second flow hole when the valve closure is opened or closed to fluid flow. The first seal element, the second seal element, the third seal element and the fourth seal element can be formed on the interior of the valve closure carrier. The stroke of the valve closure can be a ninety degree rotation of the valve closure on an axis that is at an angle to a direction of the flow. The distance that the second seal element extends on the interior surface of the valve closure can be at least one-quarter of the perimeter of the interior surface of the valve closure. At least one of the first seal element, the second seal element, the third seal element or the fourth seal element can include an elastomeric seal. In the well valve, the central bore of the valve closure can be sealed to the valve closure carrier with a third seal element that surrounds a second flow hole in the valve closure carrier. In the well valve, the valve closure carrier can be sealed to the valve closure with a fourth seal element that surrounds the third seal element and that surrounds a second fluid end opening to the central bore of the valve closure when the well valve is closed. In the well valve, sealing the valve closure carrier to the valve closure with the second seal element can include sealing an interior of the valve closure carrier to an exterior of the valve closure. The first seal element and the second seal element can be formed on an interior of the valve closure carrier.

A number of implementations have been described. Nevertheless, it will be understood that various modifications may be made without departing from the spirit and scope of the disclosure.

The invention claimed is:

1. A well valve comprising:
a valve closure comprising an interior, central bore;
a valve closure carrier comprising an annular, metal sealing surface in contact with the exterior of the valve closure to form a metal-to-metal seal with the valve closure, the valve closure carrier defining a first flow hole and a second flow hole, each of the first flow hole and the second flow hole communicates with the central bore when the valve closure is open to flow fluid, and is sealed from the central bore by the sealing surface when the valve closure is closed; and
a first seal element to seal between the valve closure carrier and the valve closure, the first seal element surrounding the first flow hole; and
a second seal element to seal between the valve closure carrier and the valve closure, the second seal element surrounding the first seal element and a first fluid end opening of the central bore when the valve closure is closed.

2. The valve of claim 1, wherein the second seal element encircles the first seal element to not be exposed to the first end fluid opening to the central bore in the valve closure when the valve closure is opened or closed to fluid flow.

3. The valve of claim 2, wherein the first end fluid opening at least partially aligns with the first flow hole when the valve closure is open to flow fluid, and wherein the second seal element is not exposed to any portion of the first end fluid opening when the valve closure is opened or closed to fluid flow.

4. The valve of claim 1, further comprising:
a third seal element to seal between the valve closure carrier and the valve closure, the third seal element surrounding the second flow hole; and
a fourth seal element to seal between the valve closure carrier and the valve closure, the fourth seal element surrounding the third seal element and a second fluid end opening of the central bore when the valve closure is closed.

5. The valve of claim 4, wherein the fourth seal element encircles the third seal element to not be exposed to the second end fluid opening to the central bore in the valve closure when the valve closure is opened or closed to fluid flow.

6. The valve of claim 5, wherein the second end fluid opening at least partially aligns with the second flow hole when the valve closure is open to flow fluid, and wherein the fourth seal element is not exposed to any portion of the second flow hole when the valve closure is opened or closed to fluid flow.

7. The valve of claim 5, wherein the third seal element and the fourth seal element are formed on the interior of the valve closure carrier.

8. The valve of claim 1, wherein the first seal element and the second seal element are formed on the interior of the valve closure carrier.

9. The valve of claim 1, wherein the stroke of the valve closure is a ninety degree rotation of the valve closure on an axis that is at an angle to a direction of the flow, and wherein the distance that the second seal element extends on the interior surface of the valve closure is at least one-quarter of the perimeter of the interior surface of the valve closure.

10. The valve of claim 1, wherein at least one of the first seal element or the second seal element comprises an elastomeric seal.

11. A well valve comprising:
a valve closure comprising an interior, central bore;
a valve closure carrier comprising an annular, metal sealing surface in contact with the exterior of the valve closure to form a metal-to-metal seal with the valve closure, the valve closure carrier defining a first flow hole and a second flow hole, each of the first flow hole and the second flow hole communicates with the central bore when the valve closure is open to flow fluid, and is sealed from the central bore by the sealing surface when the valve closure is closed;
a first non-metal seal element to seal the first flow hole to the central bore when the valve closure is open, the first non-metal seal element surrounding the first flow hole; and
a second non-metal seal element to seal between the valve closure carrier and the valve closure, the second non-metal seal element surrounding the first non-metal seal element and that avoids exposure to a first fluid end opening to the central bore when the valve closure is opened or closed, wherein the second non-metal seal element extends on the exterior of the valve closure to a distance that is greater than or equal to a stroke of the valve closure during opening or closing of the valve closure.

12. The well valve of claim 11, wherein the stroke is a ninety degree turn of the valve closure on an axis that is at an angle to a direction of fluid flow, and wherein the distance to which the second non-metal seal element extends is at least one-quarter of the perimeter of the exterior of the valve closure.

13. The valve of claim 11, further comprising:
a third non-metal seal element to seal the second flow hole to the central bore when the valve closure is open, the third non-metal seal element surrounding the second flow hole; and
a fourth non-metal seal element to seal between the valve closure carrier and the valve closure, the fourth non-metal seal element surrounding the third non-metal seal element and that avoids exposure to a second fluid end fluid opening to the central bore when the valve closure is opened or closed.

* * * * *